United States Patent
Fu et al.

(10) Patent No.: US 10,348,493 B2
(45) Date of Patent: Jul. 9, 2019

(54) QUANTUM KEY DISTRIBUTION SYSTEM, METHOD AND APPARATUS BASED ON TRUSTED RELAY

(71) Applicant: ALIBABA GROUP HOLDING LIMITED, George Town, Grand Cayman (KY)

(72) Inventors: Yingfang Fu, Beijing (CN); Shuanlin Liu, Hangzhou (CN); Yabin Gao, Beijing (CN); Xiuzhong Chen, Beijing (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 210 days.

(21) Appl. No.: 14/989,586

(22) Filed: Jan. 6, 2016

(65) Prior Publication Data

US 2016/0248581 A1 Aug. 25, 2016

(30) Foreign Application Priority Data

Jan. 8, 2015 (CN) .......................... 2015 1 0009615

(51) Int. Cl.
*H04L 29/06* (2006.01)
*H04L 9/08* (2006.01)

(52) U.S. Cl.
CPC .......... *H04L 9/0858* (2013.01); *H04L 9/0855* (2013.01)

(58) Field of Classification Search
None
See application file for complete search history.

(56) References Cited

U.S. PATENT DOCUMENTS

| 5,812,666 | A | 9/1998 | Baker et al. |
| 5,953,421 | A | 9/1999 | Townsend |
| 7,248,695 | B1 | 7/2007 | Beal et al. |
| 7,392,378 | B1 * | 6/2008 | Elliott ................. H04L 63/0428 380/277 |
| 7,512,242 | B2 | 3/2009 | Pearson et al. |
| 7,620,182 | B2 | 11/2009 | Berzanskis et al. |
| 9,118,464 | B2 * | 8/2015 | Nix .......................... H04W 4/70 |

(Continued)

FOREIGN PATENT DOCUMENTS

| EP | 1 742 408 A2 | 7/2006 |
| WO | WO 2012/072983 A2 | 6/2012 |
| WO | WO 2012/072983 A3 | 7/2012 |

OTHER PUBLICATIONS

Pattaranantakul, Montida et al. Secure and Efficient Key Management Technique in Quantum Cryptography Network. 2012 Fourth International Conference on Ubiquitous and Future Networks (ICUFN). https://ieeexplore.ieee.org/stamp/stamp.jsp?tp=&arnumber=6261711 (Year: 2012).*

(Continued)

*Primary Examiner* — Jeremiah L Avery
(74) *Attorney, Agent, or Firm* — Finnegan, Henderson, Farabow, Garrett & Dunner, LLP (57) ABSTRACT

A quantum key distribution system is provided. The quantum key distribution system includes a plurality of routing devices configured to relay keys and a quantum key distribution device connected with the routing devices and configured to use two or more different paths to perform corresponding quantum key negotiations with another quantum key distribution device to obtain shared keys. The two or more different paths each include one or more of the routing devices.

29 Claims, 7 Drawing Sheets

(56) References Cited

U.S. PATENT DOCUMENTS

| | | | |
|---|---|---|---|
| 2004/0120528 A1* | 6/2004 | Elliott | H04L 63/06 380/278 |
| 2004/0184603 A1 | 9/2004 | Pearson et al. | |
| 2005/0036624 A1 | 2/2005 | Kent et al. | |
| 2005/0078826 A1 | 4/2005 | Takeuchi | |
| 2005/0286723 A1* | 12/2005 | Vig | H04L 9/0855 380/278 |
| 2006/0013396 A1 | 1/2006 | Kollmitzer | |
| 2007/0248091 A1 | 10/2007 | Khalid et al. | |
| 2008/0117821 A1 | 5/2008 | Asati et al. | |
| 2008/0137858 A1 | 6/2008 | Gelfond et al. | |
| 2008/0137868 A1 | 6/2008 | Sanders et al. | |
| 2008/0144836 A1 | 6/2008 | Sanders et al. | |
| 2008/0222734 A1* | 9/2008 | Redlich | G06F 21/577 726/26 |
| 2010/0299526 A1* | 11/2010 | Wiseman | H04L 9/0855 713/171 |
| 2010/0329459 A1* | 12/2010 | Wiseman | H04B 10/70 380/256 |
| 2011/0265147 A1 | 10/2011 | Liu | |
| 2012/0177201 A1* | 7/2012 | Ayling | H04B 10/70 380/278 |
| 2013/0091352 A1 | 4/2013 | Patel et al. | |
| 2013/0227286 A1* | 8/2013 | Brisson | H04L 63/062 713/168 |
| 2014/0372761 A1* | 12/2014 | Cherukuri | H04L 63/0272 713/171 |

OTHER PUBLICATIONS

Wang, Ping et al. Quantum Key Distribution for Security Guarantees Over Quantum-Repeater-Based QoS-Driven 3D Satellite Networks. 2014 IEEE Global Communications Conference. https://ieeexplore.ieee.org/stamp/stamp.jsp?tp=&arnumber=7036894 (Year: 2014).*

Alshowkan, Muneer; Elleithy, Khaled. Secret Key Sharing Using Entanglement Swapping and Remote Preparation of Quantum State. 2014 IEEE Long Island Systems, Applications and Technology (LISAT) Conference. https://ieeexplore.ieee.org/stamp/stamp.jsp?tp=&arnumber=6845215 (Year: 2014).*

Maurhart, O. et al. Node Modules and Protocols for the Quantum-Back-Bone of a Quantum-Key-Distribution Network. 2009 35th European Conference on Optical Communication. https://ieeexplore.ieee.org/stamp/stamp.jsp?tp=&arnumber=5287409 (Year: 2009).*

PCT International Search Report and Written Opinion dated Mar. 28, 2016, issued in corresponding International Application No. PCT/US2016/12306 (10 pages).

Extended European Search Report in European Application No. 16735342.4-1870 (PCT/US2016012306), pursuant to Rule 62 EPC, the Supplementary European Search Report (Art 153(7) EPC) and the European Search Opinion, dated Oct. 9, 2017.

Chinese Search Report issued, by the State Intellectual Property Office of the People's Republic of China in counterpart Chinese Application No. 201510009615.5 dated Jul. 26, 2018 (1 page).

First Chinese Office Action issued by the State Intellectual Property Office of the People's Republic of China in counterpart Chinese Application No. 201510009615.5 dated Aug. 3, 2018 (26 page).

Zhao, Hong-tao et al. Multi-path Quantum Key-negotiation Technique Based on Bit-negotiation, Journal of Zhongyuan University of Technology, vol. 25, No. 6, Dec. 25, 2014 (4 pages).

* cited by examiner

QUANTUM KEY DISTRIBUTION SYSTEM, METHOD AND APPARATUS BASED ON TRUSTED RELAY

CROSS-REFERENCE TO RELATED APPLICATION

The present application is based on and claims the benefits of priority to Chinese Application No. 201510009615.5, filed Jan. 8, 2015, the entire contents of which are incorporated herein by reference.

TECHNICAL FIELD

The present application relates to the field of quantum key distribution, specifically to a quantum key distribution system based on trusted relays. The present application also provides a quantum key distribution method based on trusted relays and a quantum key distribution apparatus based on trusted relays.

BACKGROUND

Quantum cryptography is a cross product of quantum mechanics and cryptography. The security of quantum cryptography is guaranteed by quantum mechanics principles. An operation with an attempt of intercepting or measuring the quantum key will change the quantum state. A receiving end may determine whether there is an eavesdropper in the communication process by detecting the change of quantum state so as to determine whether to abandon the key, thus providing guarantee of unconditional security to the communication. The quantum key negotiation protocols such as BB84, which is currently used, may realize an end-to-end Quantum Key Distribution (QKD).

With the development of end-to-end quantum key distribution technology, people begins to pay more attention to the QKD network, and some companies and research institutions have started to establish the QKD network in different mechanisms, including: the QKD network based on optical devices, the QKD network based on trusted relays, and a pure-quantum network based on quantum relays. The QKD network based on trusted relays may meet the requirements of multi-user and long-range transmission, and may even provide a global key distribution network theoretically. Under current technology, this network is easy to be implemented, and therefore, the trusted relay mechanism becomes an effective means for realizing a large-scale QKD network architecture. For example, the SECOQC quantum secured communication network established in Europe, the Tokyo high-speed quantum network established in Japan, and the quantum government affairs network established in China all use the trusted relay mechanism.

Figure 1:
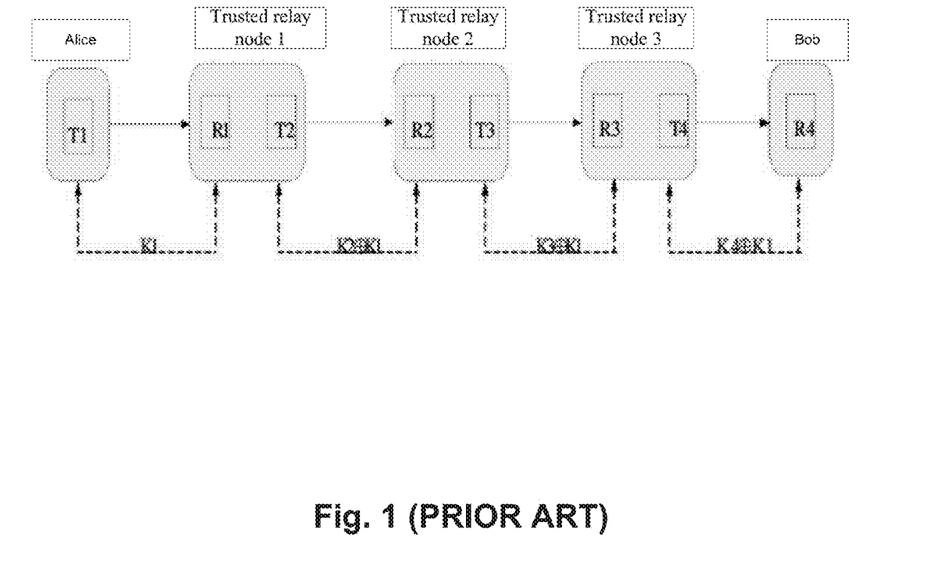
FIG. 1 is a schematic diagram of a quantum key transmission model based on trusted relays in the prior art.

FIG. 1 shows a schematic diagram of a trusted relay quantum key transmission model, under which Alice and Bob can have a secured communication. There are three trusted relay nodes altogether in a key negotiation path between the two. First, a key distribution link is established between the sender Alice and a trusted relay node 1 for performing quantum key negotiation to generate a key K1; subsequently, a key distribution link is established between the trusted relay node 1 and a trusted relay node 2 for performing quantum key negotiation to generate a shared key K2, and key K1 is encrypted by using key K2 and then transferred to the trusted relay node 2; . . . and so on, finally, Bob receives key K1 encrypted by using a key K4, and Bob decrypts key K1 by utilizing key K4 to obtain key K1, so that the secured communication can be performed between Alice and Bob by using key K1.

As can be seen from the above description of the key relay process, a QKD network based on trusted relay requires that the relay nodes must be secure. If any one of the relay nodes is broken, the whole path will become insecure, and the security and stability of data communication will be greatly affected. By adopting the above key relay mechanism, the key code generating amount (i.e.: key distribution amount) is also relatively low, and cannot meet the requirements of certain application scenarios (such as cloud computing), which use relatively large key amount.

SUMMARY

One aspect of the present disclosure is directed to a quantum key distribution system. Consistent with some embodiments, the quantum key distribution system includes a plurality of routing devices configured to relay keys, and a quantum key distribution device connected with the routing devices and configured to use two or more different paths to perform corresponding quantum key negotiations with another quantum key distribution device to obtain shared keys. The two or more different paths each include one or more of the routing devices. According to one embodiment, the two or more different paths do not share any common routing device. The two or more different paths may be selected according to load balancing of the routing devices.

Consistent with some embodiments, the quantum key distribution device may be further configured to combine the shared keys to generate a new shared key. In one embodiment, the quantum key distribution device may be further configured to send, before initiating the corresponding quantum key negotiations, path information about the quantum key negotiations to a routing device in the path and to the another quantum key distribution device. According to another embodiment, the quantum key distribution device is connected to at least two of the routing devices.

According to some embodiments, the quantum key distribution device may be further configured to encrypt and decrypt data. The quantum key distribution system may further include a quantum gateway device through which the quantum key distribution device is connected to a data device, and the quantum gateway device is configured to encrypt and decrypt data by using a quantum key provided by the quantum key distribution device.

The quantum key distribution device may use wavelength division multiplexing and/or time division multiplexing to perform the key negotiations.

The routing device may use at least one of optical bifurcation multiplexing, optical cross interconnection, or optical packet switching, to forward data encrypted with the quantum key. The quantum key distribution system may be deployed in a cloud computing data center. The quantum key distribution device may be connected to a server in the cloud computing data center.

Another aspect of the present disclosure is directed to a quantum key distribution method. Consistent with some embodiments, the method may include selecting two or more paths each including one or more routing devices, the one or more routing devices connecting a quantum key distribution device with another quantum key distribution device, and performing key negotiations by the quantum key distribution device with the another quantum key distribution device through the two or more different paths to obtain shared keys. In some embodiments, the two or more different paths do not share any common routing device. In some other embodiments, the selecting the two or more paths may be based on a hop-by-hop dynamic routing mechanism. In some further embodiments, the two or more different paths are selected according to load balancing of the routing devices.

The quantum key distribution method may further include combining the shared keys to generate a new shared key. Before combining the shared keys, the method may further include acquiring, by the quantum key distribution device, a safety assessment result of performing key negotiation via each of the two or more paths, and determining whether the combining the shared keys is needed based on the safety assessment result. If the combining the shared keys is needed, the quantum key distribution device may select a key combination operation, communicate the selected key combination operation through a classical channel to the another quantum key distribution device. The quantum key distribution device and the another quantum key distribution device combine the shared keys with the key combination operation.

The quantum key distribution method may further include sending, by the quantum key distribution device, through a classical channel, path information of each selected path to the routing devices in the selected path. The routing devices may verify an identity of the quantum key distribution device using the path information. The quantum key distribution device may also send, through a classical channel, path information of each selected path to the another quantum key distribution device, and the another quantum key distribution device verifies an identity of the quantum key distribution device using the path information.

Consistent with some other embodiments, the quantum key distribution method may further include verifying, by the quantum key distribution device, an identity of the another quantum key distribution device through a classical channel. The quantum key distribution device may use an obtained shared key to encrypt data to be transmitted. The quantum key distribution device may forward the encrypted data to the another quantum key distribution device. The another quantum key distribution device may use a copy of the obtained shared key to decrypt the received data.

A further aspect of the present disclosure is directed to a quantum key distribution device. The quantum key distribution device may include a multi-path negotiation unit configured to perform key negotiations with another quantum key distribution device through two or more different paths. In some embodiments, the two or more different paths each include one or more routing devices and the two or more different paths do not share any common routing device. The device may further include a combination determination unit configured to determine whether a combination operation is required to be performed on shared keys obtained through the key negotiations, and a combination unit configured to, if the combination operation is required to be performed on the shared keys obtained through the key negotiation process, combine the shared keys to generate a new shared key. The device may further include a path acquisition unit configured to select the two or more different paths through which the key negotiations are performed with the another quantum key distribution device according to topology information about a quantum key distribution system including the quantum key distribution device.

Additional features and advantages of the present disclosure will be set forth in part in the following detailed description, and in part will be obvious from the description, or may be learned by practice of the present disclosure. The features and advantages of the present disclosure will be realized and attained by means of the elements and combinations particularly pointed out in the appended claims It is to be understood that the foregoing general description and the following detailed description are exemplary and explanatory only, and are not restrictive of the invention, as claimed.

DETAILED DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

The present disclosure provides a quantum key distribution system based on trusted relays, a quantum key distribution method based on trusted relays, and a corresponding apparatus. The detailed description will be made in the following embodiments.

Figure 2:
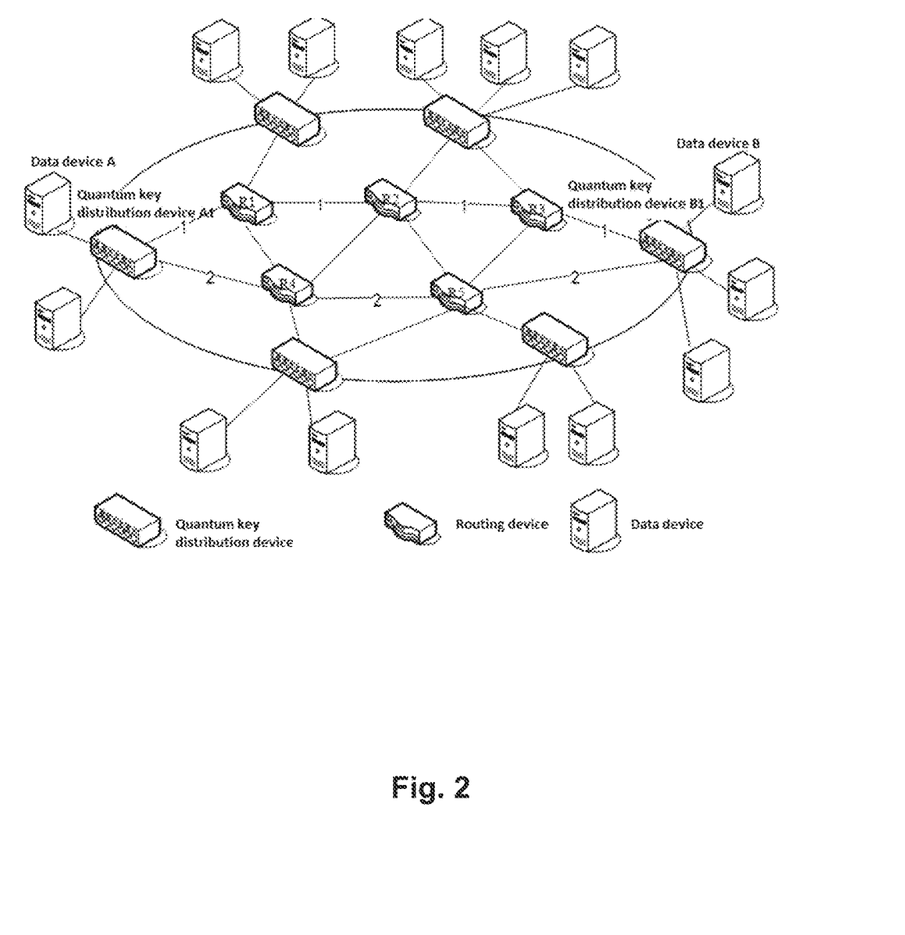
FIG. 2 is a schematic diagram of a quantum key distribution system based on trusted relays of one embodiment of the present disclosure.

FIG. 2 shows a schematic diagram of a quantum key distribution system based on trusted relays according to one embodiment of the present disclosure. The quantum key distribution system comprises: quantum key distribution devices, routing devices for relaying a key and forwarding encrypted data, and data devices for data transmission at source ends or destination ends. Each of the quantum key distribution devices may be connected to at least one of the routing devices and at least one of the data devices. The routing devices are connected to each other, with the sender quantum and/or the receiver quantum distribution device to form a network (topology). The quantum key distribution device uses two or more different paths to perform corresponding key negotiations with an opposite-end (i.e. another) quantum key distribution device, and uses a preset strategy to determine whether shared keys obtained by the negotiations need to be combined, and executes a corresponding combination operation when necessary. The "opposite-end" may define a relationship between a sender and a receiver. For example, an opposite-end quantum key distribution device of a quantum key distribution receiver device may be a quantum key distribution sender device. The two or more different paths may each include one or more of the routing devices and may not share any common routing device.

The existing quantum key distribution network based on trusted relays cannot guarantee the security of a key if relay node is broken on the one hand, and also has a relatively low key distribution amount on the other hand. According to some embodiments of the present disclosure, based on that the routing devices are connected to each other to form a network topology, a quantum key distribution device can use two or more different paths to perform key negotiations with the opposite-end quantum key distribution device. The two or more two different paths according to the embodiments of the present disclosure mean that the routing devices contained in any two paths are not all the same.

According to some embodiments, different paths for performing quantum key negotiations may be selected by using a static routing (also referred to as designated routing). The quantum key distribution device may maintain topology information about the whole network through mechanisms, such as network flooding. Before initiating a quantum key negotiation process, the quantum key distribution device may implement a load balancing strategy, considering load conditions of routing devices and occupation conditions of links in the network topology. The routing devices and links which are relatively idle are selected to form two or more different paths. Each routing device to which each path connects performs key negotiation and relaying along the path. Alternatively, a dynamic routing mechanism may be used. The quantum key distribution device and the routing device use a hop-by-hop dynamic routing mechanism, and according to routing table information which is locally stored and based on strategies, such as load balancing, choose next-hop routing to reach an opposite-end quantum key distribution device.

In some other embodiments, each quantum key distribution device is connected to at least two routing devices. Since the routing devices are connected to each other by using the network topology, the quantum key distribution device may use multiple paths which are completely unrelated when performing key negotiation. In some embodiments, neither of any two paths therein has a common routing device.

As shown in FIG. 2, secured data transmission is performed between a data device A and a data device B, and a quantum key distribution device A1 uses a path 1 and a path 2 to perform key negotiations with an opposite-end quantum key distribution device B1. The path 1 includes routing devices R1, R2 and R3, and the path 2 includes routing devices R4 and R5. Since the path 1 and the path 2 do not include the same routing device, they are two separate paths.

The quantum key distribution device uses two or more different paths to perform key negotiations with the opposite-end quantum key distribution device. In each path, every two neighboring devices use a QKD link therebetween to acquire a shared key between the two through phases, such as key transmission, data screening, data coordinating and privacy amplification, and uses the shared key on a section-by-section basis to perform "encryption-decryption-encryption . . . decryption" relaying forwarding operations on a shared key acquired by a sender quantum key distribution device, and finally, a receiver quantum key distribution device and the sender quantum key distribution device acquire the same shared key. Since multipath negotiation is used, both receiver and sender may acquire multiple shared keys. For example, in the example shown in FIG. 2, the quantum key distribution device A1 and the quantum key distribution device B1 acquire two shared keys key 1 and key 2 through key negotiation processes on two paths.

With regard to the acquired two or more shared keys, the quantum key negotiation devices of the receiver and the sender may use a preset strategy to determine whether the shared key obtained through the negotiation processes need to be combined, and a corresponding combination operation is performed when needed.

The preset strategy includes determining whether a key combination operation is required from the safety perspective according to a bit error rate and/or risk probability during the key negotiation process. During the key negotiation process by means of relaying, each two adjacent devices may estimate bit error rate of the key negotiation and may further calculate risk probabilities of various potential attacks (such as amplified light blindness attack, beam splitting attack, dead-time attack, and the like), and may gather the bit error rate estimate values and/or risk probabilities for each section of a relay link of each path. If the above data of a certain path exceeds a preset safety range, it may be considered that the key negotiation of the path has the risk of being attacked, and the relay node (i.e., the routing device described in the present embodiment) also has safety risk of being broken. In this case, combination of the shared keys obtained through negotiation can be performed to lower the risk resulted from breaking a relay node and enhance the safety of quantum key distribution.

The described combination of the shared keys obtained through the key negotiation process refers to a process for processing a plurality of shared keys obtained through multipath negotiation and generating a new key by using a preset algorithm. For example, an XOR operation may be performed on the plurality of shared keys, or the XOR operation may be performed after a shift operation, etc. A person having ordinary skill in the art should appreciate that many other combination algorithms can be used.

For example, in the example shown in FIG. 2, the quantum key distribution devices A1 and B1 obtain a shared key 1 through the negotiation of the path 1 and a shared key 2 through the negotiation of the path 2, and calculate an indicator value characterizing the safety of the key negotiation process after gathering the bit error rate estimate values and risk probabilities for each section of the relay link in the path 1. The indicator value exceeding the preset safety range illustrates that the key negotiation process via path 1 may be attacked, and safety risk exists for each relay node. If the corresponding indicator value of path 2 does not exceed the safety range, the quantum key distribution devices A1 and B1 can perform combination operation on key 1 and key 2 by using the preset XOR algorithm and generate a new key 3. That is, key 3=key 1 xor key 2, and use the key 3 to perform encryption and decryption on data transmitted between the data device A and the data device B.

In the above example, if the safety indicator values do not exceed the preset safety range, which means that the key negotiation process based on path 1 and path 2 are safe and each relay node is also safe, the key combination operation may not be performed. The quantum key distribution devices A1 and B1 have obtained two share keys through the negotiation and can use the two keys for the secured communication between the data devices A and B.

As can be seen from the above analysis, for the quantum key distribution system provided by the embodiments of the present disclosure, under the application scenarios with relatively high network security, as multiple paths are used for key negotiation, the key distribution amount is increased by improving the utilization rate of the routing devices and links. Under the application scenarios with relatively low network security, even if the relay nodes of a certain path or a plurality of paths are broken, and the corresponding key obtained through negotiation is no longer safe, a new shared key still can be generated by performing the combination operation on keys of different paths as long as one of the paths is secure (i.e., all the relay nodes are not attacked), so that the potential safety hazard that some relay nodes are attacked can be cured, improving the security of the whole quantum key distribution network.

A person having ordinary skill in the art should appreciate that the above-described are exemplary embodiments, and modification or adjustment can be made in specific implementations. For example, instead of gathering the bit error rate and risk probability of each relay link, the bit error rate and risk probability of certain links are gathered and used to calculate the indicator value. The bit error rate and/or risk probability may also not be used as a security evaluation parameter, but other indexes, such as indexes obtained through monitoring the security of the relay nodes are used. The strategy of how to determine whether combination is needed according to the evaluation parameter or indexes can also be adjusted according to practical application needs. The specific combination algorithm can also be different from the above example. The above are all modifications of the embodiments of the present disclosure, without departing from the core of the present disclosure, and all fall within the scope of protection of the present disclosure.

Furthermore, for possible attacks from man-in-the-middle (attacks by means of interception and retransmission by a man-in-the-middle) in a quantum key negotiation process, the present disclosure also provides a path validation technology. For example, in some embodiments, before the quantum key distribution devices of the receiver and sender perform the corresponding key negotiations, the quantum key distribution device that initiates quantum key negotiation sends the path information about the key negotiations to various routing nodes included in the path and the quantum key distribution device of the receiver through classical channels. As each path consists of section by section relay links, the path information includes the node information of each section of a link in the path, and therefore, it is also referred to as path link information.

The routing device and the quantum key distribution device of the receiver store the received path link information, and in a subsequent quantum key negotiation process, verify, according to the path link information, the identity legality of (i.e. authenticate) the routing device or quantum key distribution device that performs key negotiation therewith. If the identify is inconsistent with the path link information, it shows that the man-in-the-middle attack may be present, and then this quantum key negotiation process may be quitted, and other paths may be reselected for quantum key negotiation.

Generally, the embodiments described above are used in conjunction with the static routing mechanism. Before starting the quantum key negotiation process, the initiator of quantum key negotiation process can acquire the complete path link information of this negotiation, and thus can send the path link information to the devices in the path in advance.

If the dynamic routing mechanism is used, a path link verification function similar to the above can also be realized by providing a monitoring node inside the network. For example, the monitoring node can obtain information about each relay node in the path where the negotiation process passes through by monitoring the key negotiation process, and identify whether there is an abnormal intermediate node through performing an analysis on the information, so as to determine whether there are attacks from the man-in-the-middle. If there are attacks from man-in-the-middle, the shared key obtained in the key negotiation process is given up.

The legality of the identity of each node in the quantum key negotiation process can be verified by using the path link verification technology, avoiding the man-in-the-middle attack and further ensuring security of the quantum key negotiation process.

Based on the multipath key negotiation described above and according to some embodiments, Wavelength Division Multiplex (WDM) technology is used to realize key negotiation among multiple quantum channels. The WDM technology divides the low loss window of optical fiber into several channels according to the difference of optical frequencies (or wavelengths) of each channel in order to make full use of the huge bandwidth resources in low-loss region of single-mode fiber. Respective information is transmitted with the different wavelengths, and does not interfere with each other even on the same fiber, so as to increase a communication capacity of optical fiber.

In this embodiment, different optical wavelength negotiation keys can be used at the same time in any path that performs multipath key negotiation when quantum key negotiation is performed between the quantum key distribution device and the routing device as the relay node and between the routing devices.

Similarly, the time division multiplexing technology can also be adopted in the above key negotiation process to achieve the object of multi-channel transmission and improve the dispensed amount of key. The time-division multiplex technology includes adopting different periods of the same physical connection to transmit different signals. Both the wavelength-division multiplexing and the time division multiplexing are mature technologies, and will not be repeated herein.

In some embodiments, the quantum key distribution device can also be used for performing encryption and decryption on the data transmitted between data devices, in addition to possessing the function of multipath key negotiation. In the example shown in FIG. 2, the quantum key distribution device A1 uses a shared key obtained through negotiation with B1, and encrypts the data transmitted by the data device A; the encrypted data is forwarded to the quantum key distribution device B1 by each routing device, B1 also adopts the shared key obtained through negotiation with A1 to decrypt the received data, then the decrypted data is sent to the data device B, so as to complete the secret communication between the data device A and the data device B.

In some other embodiments, the function of encrypting and decrypting the data can be taken away from the quantum key distribution device, and be completed by the quantum gateway. In other words, the quantum key distribution system described above can further comprise a quantum gateway device, and the quantum key distribution device can be connected with data devices through the quantum gateway device. The quantum key distribution device is responsible for performing the multipath key negotiation, and providing the quantum key obtained through negotiation to the quantum gateway device connected thereto, and the quantum gateway device then adopts the quantum key to perform encryption and decryption on the data transmitted between the data devices.

In one embodiment, one of the two kinds of encryption and decryption modes described above can be selected according to actual needs. The encrypted data is forwarded via the routing device, finally arrives at the opposite-end quantum key distribution device, and after being decrypted, is sent to the data device at the destination end in this data transmission. In the process that the routing device forwards encrypted data, one or more of OADM, optical bifurcation multiplexing, optical cross connecting, and optical packet switching can be used. The dispensed amount of key can be improved because of adopting the multipath key negotiation mode, and therefore, the capacity of encrypted data transmission can also be effectively improved. The above-mentioned optical transmission technology can include the following:

1) optical add/drop multiplex (OADM) is for inserting or separating the optical signals from a wavelength division multiplexing transmission link by an optical filter or demultiplexer. The WDM system selects the optical wavelength signal having desired upper/lower rate, form and protocol type, that is: only the desired wavelength signals are branched/inserted on a node, and other wavelength signals are then passed through this node in an optically transparent way;

2) the optically cross interconnection, used for the device of fiber optic network nodes, can efficiently and flexibly manage optical fiber transmission network by performing cross connection on the optical signals, and it is an important means to realize reliable network protection/recovery and automatic wiring and monitoring; and 3) the optical packet switching including all-optical packet switching can be classified into two categories: timeslot and non-timeslot. In the timeslot network, the packet length is fixed, and transmits in the timeslot. The length of timeslot should be greater than the time limit of the packet so as to set protection intervals in the front and back of the packet. In a non-timeslot network, the size of packet is variable, and before switching, arrangement is not required, each packet is switched asynchronously and freely.

In one embodiment, in the process of performing the key negotiation or data encrypting and deciphering interaction, the quantum key distribution system can comprehensively use wavelength-division multiplexing, time division multiplexing, and the above-mentioned optical transmission technologies to achieve the multipath key negotiation, improving key distribution amount and data interactive throughput.

In some embodiments described above, by employing multipath key negotiation mechanisms, the system can obtain the beneficial effects of improving key distribution amount and improving key distribution safety.

In some embodiments, in the cloud computing environment, data interaction between each server of the cloud backbone network, the remote backup and interaction of data in each data center of the cloud network, and cloud user accessing cloud resource all demand key security. The encryption method in a classic network cannot provide a reliable security, and existing various miniature quantum key distribution networks cannot meet the requirements of cloud key security distribution, either. The requirements may be based on, for example, the throughput and code-forming amount of quantum key distribution network, the transmission distance of keys, multi-user participation, and ensuring that any user can communicate with the cloud backbone network and for convergence with existing public network.

In some embodiments, based on the above-mentioned consideration, the quantum key distribution system based on trusted relay can be applied to the cloud network architecture, thereby solving the above-mentioned problem. The three aspects are described below according to some embodiments: the cloud backbone network (data center), cloud user accessing data center, and distributed data center.

(I) Cloud Backbone System Architecture.

A cloud backbone network of the cloud operator (i.e., the data center), may include various server clusters, such as file server cluster, Web server cluster, application server cluster, management server cluster, and list server cluster. Each cluster comprises several servers, with a large data volume transmitting among themselves, and have high demand for the key distributing amount and data transmission among the whole network.

The quantum key distribution system based on trusted relay according to one embodiment is deployed in the above-mentioned cloud computing data center, and the data devices for data transmission at the source ends or destination ends are the above-mentioned various servers. The plurality of servers connected with each quantum key distribution device can be the servers with identical function (such as file servers), also can be servers with different functions from each other (such as web server and management server etc.).

In some embodiments, the existing cloud computing data center may adopt a three-tier architecture, and the quantum key distribution system provided by the present embodiment may adopt a flat architecture based on the routing device. In order to realize smooth transition between the existing three-tier architecture and the flat architecture, and to extend the limited port number of the quantum key distribution device to realize the access of more servers, an optical switch can be introduced in the data center network architecture. A routing device can be connected with one or more optical switches, and an optical switch is connected with one or more quantum key distribution devices.

In some embodiments, the quantum key distribution system provided by the present embodiment is deployed in the cloud computing data center. In order to realize the secret communication between data center servers, the quantum key distribution device connected with the server adopts two or more paths to perform key negotiation, and adopts the preset strategy to perform the desired combination operation of the key. In addition, the path link verification, wavelength-division multiplexing, time division multiplexing and other optical transport technologies, described above can be applied to the data center for achieving the object of improving key distribution amount, data interactive throughput, and improving key distribution procedure security, thereby meeting the requirements of the cloud computing data center.

(II) The System Architecture for Cloud User Accessing Data Center.

The quantum key distribution system may also comprise: a cloud user network having a quantum key distribution device. The quantum key distribution device of the cloud user network is connected to two or more quantum key distribution devices of the cloud computing data center.

Figure 3:
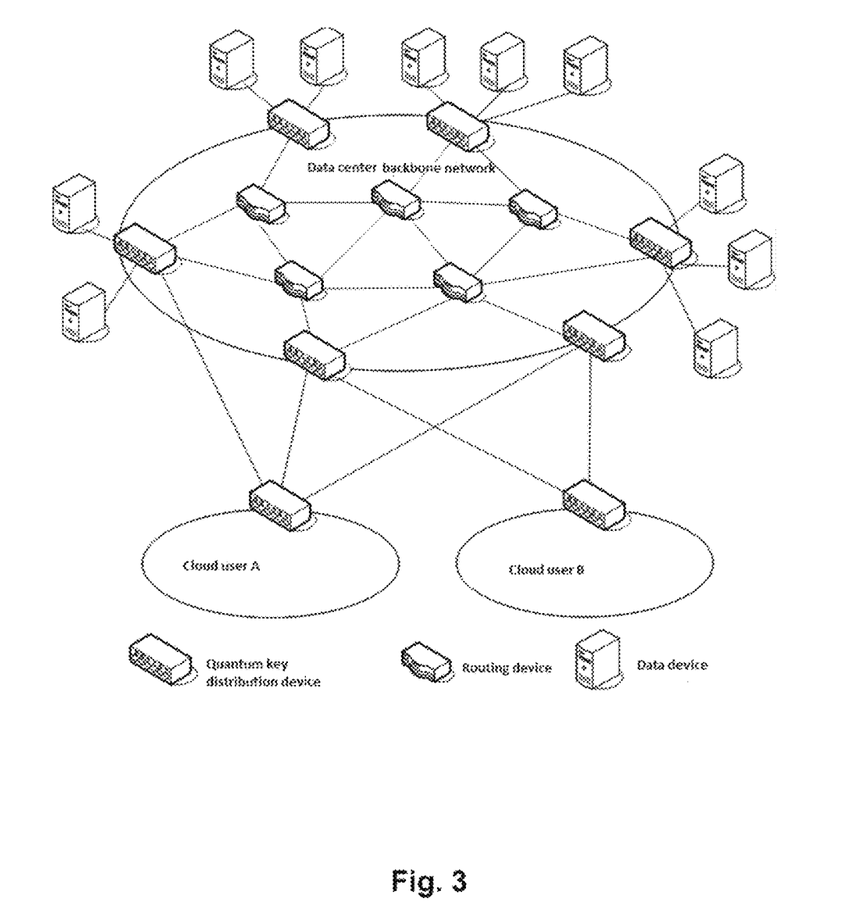
FIG. 3 is a schematic diagram of a system architecture of a cloud user access data center according to one embodiment of the present disclosure.

FIG. 3 shows a schematic diagram of the system architecture for cloud user accessing data center provided by an embodiment of the present disclosure. In this example, a cloud computing data center and two cloud user networks (network A and network B) are included. The cloud user network A uses its quantum key distribution device to connect with three quantum key distribution devices of the cloud computing data center by an incoming optical fiber. The cloud user network B uses its quantum key distribution device to connect with two quantum key distribution devices of the cloud computing data center by an incoming optical fiber. Cloud user network generally also comprises an internal gateway and multiple terminal devices for accessing the cloud computing data center, which is not illustrated in this schematic diagram.

In some embodiments, the quantum key distribution device of the cloud user network can use two or more different paths to perform key negotiation with an opposite-end quantum key distribution device of the cloud computing data center, determine whether a shared key obtained by the negotiation needs to be combined using the preset strategy, and execute a corresponding combination operation when necessary. By a multipath negotiation mechanism, the security of quantum key distribution process and the distribution amount of the quantum key are increased. In the process of key negotiation in any of the paths, the quantum key distribution device of the cloud user network can realize the key negotiation of a multiple-quantum channel by the wavelength-division multiplexing technology and/or time-division multiplexing technology, to further improve the key distribution amount. In addition, the path link verification, OADM technology, and the optical cross interconnection technology, optical packet switching technology described above also can be applied to the system architecture for cloud user accessing data center to improve the key distribution amount and the data interactive throughput.

In one embodiment, based on business needs, the cloud user network can provide two or more quantum key distribution devices, and each quantum key distribution device is connected with the two or more quantum key distribution devices of the cloud computing data center.

(III) System Architecture of Distributed Data Center.

In some embodiments, cloud service providers offer business service to the cloud users through the data center, and generally perform data backup by using a backup data center. Alternatively, the cloud providers adopt dual-active data center to provide business service to the cloud users. In addition, with the development of cloud computing technology, the cloud providers providing a single data center may not be able meet the requirements of cloud users. Multiple data centers usually set up in different areas. Under the above-mentioned distributed architecture based on many data centers, the requirement of distributed cloud computing to key distribution amount and key security can be met by disposing the quantum key distribution network.

For example, the quantum key distribution system is respectively deployed in multiple data centers of a distributed cloud computing network, the data device can be a server of each data center, and the multiple data centers are connected through the quantum key distribution device to form a network topology.

Figure 4:
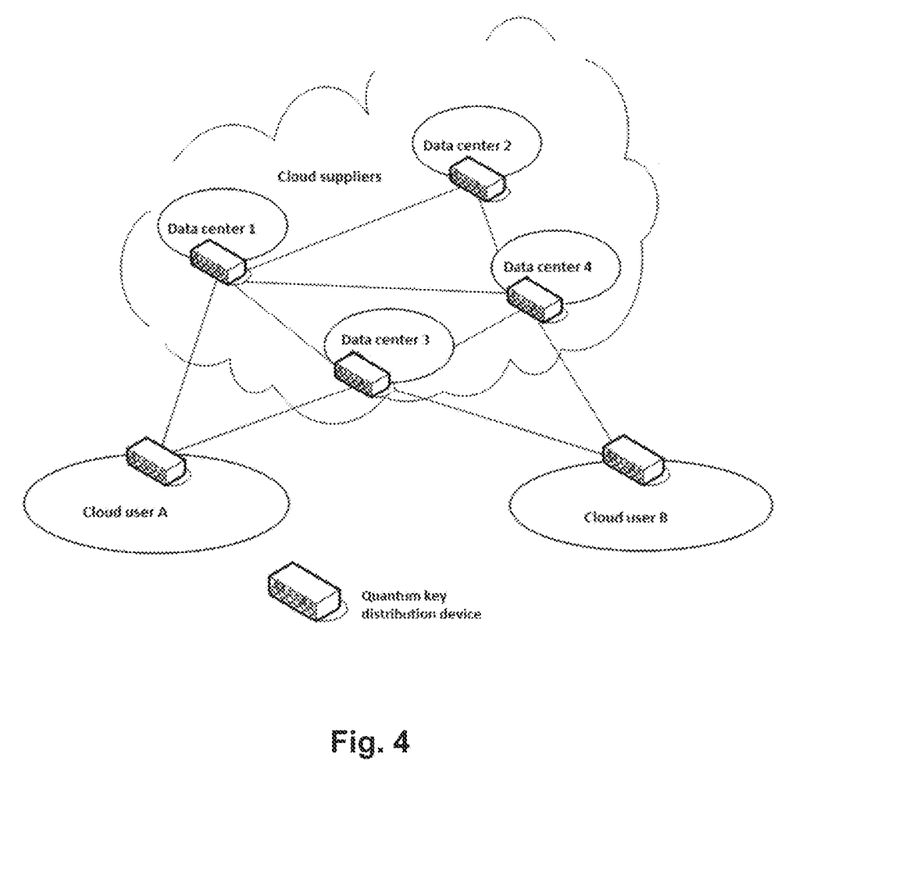
FIG. 4 is a schematic diagram of system architectures of a distributed data center and a cloud user access distributed data center according to one embodiment of the present disclosure.

FIG. 4 shows a schematic diagram for a system architecture of the distributed data center and the cloud user accessing data center according to some embodiments. In one example, four dual-active data centers of cloud supplier are connected through the quantum key distribution device to form a network topology. When data backup or data transmission is performed on the four data centers, the quantum key distribution device of the data center as the source end can perform key negotiation with the opposite-end quantum key distribution device positioned in different data centers by adopting two or more different paths, determine whether a shared key obtained by the negotiation needs to be combined by adopting the preset strategy, and execute a corresponding combination operation when necessary. The security of quantum key distribution process and the distribution amount of the quantum key are improved by a multipath agreement mechanism. Furthermore, in some embodiments, the system also comprises a cloud user network with quantum key distribution devices, which is connected to the quantum key distribution device of two or more data centers through the quantum key distribution device thereof.

In the example described above, two cloud user networks, i.e., network A and network B, are connected with the quantum key distribution devices of two data center respectively through fibers. Cloud user network usually may also comprise an internal gateway and multiple terminal devices for accessing the cloud computing data center, which is not illustrated in this schematic diagram. The quantum key distribution device of the cloud user network can perform key negotiation with an opposite-end quantum key distribution device of the data center by adopting two or more different paths, and determine whether a shared key obtained through the negotiation needs to be combined by adopting the preset strategy and executing a corresponding combination operation when necessary. The security of quantum key distribution process and the distribution amount of the quantum key are increased by the multipath agreement mechanism. In the process of key negotiation in any of the paths, the quantum key distribution device of the cloud user network can realize the key negotiation of a multiple-quantum channel by the wavelength-division multiplexing technology and/or time-division multiplexing technology, to further improve the key distribution amount. In addition, in some examples, the path link verification, OADM technology, the optical cross-interconnection technology, and the optical packet switching technology can also be applied to the system architectures of a distributed cloud computing data center and a cloud user accessing data center so as to improve the key distribution amount and the data interactive throughput.

Figure 5:
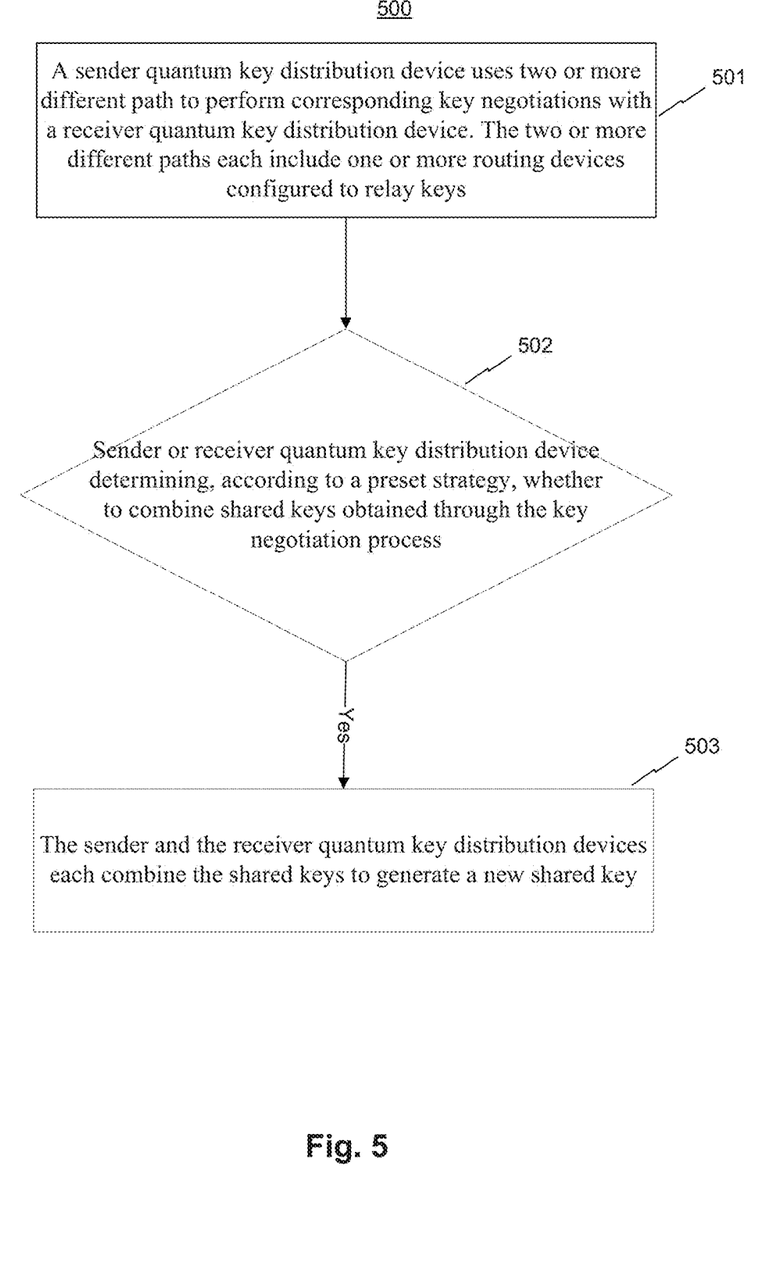
FIG. 5 is a flow chart of a quantum key distribution method based on trusted relays according to one embodiment of the present disclosure.

The quantum key distribution system based on trusted relays can implement a corresponding quantum key distribution method. FIG. 5 shows a flow chart of a quantum key distribution method 500 based on trusted relays, consistent with some embodiments of the present disclosure.

The method comprises:

Step 501: a sender quantum key distribution device uses two or more different path to perform corresponding key negotiations with a receiver quantum key distribution device. The two or more different paths each include one or more routing devices configured to relay keys.

Performing multipath quantum key negotiation can improve the code-forming amount of the quantum keys and can fend off attacks to the relaying node (i.e., the routing device). In order to further improve the security of quantum key negotiation process, in one embodiment, both the receiver and sender perform identity verification and verify the key negotiation path, and the present step is further described below with reference to FIG. 6.

Figure 6:
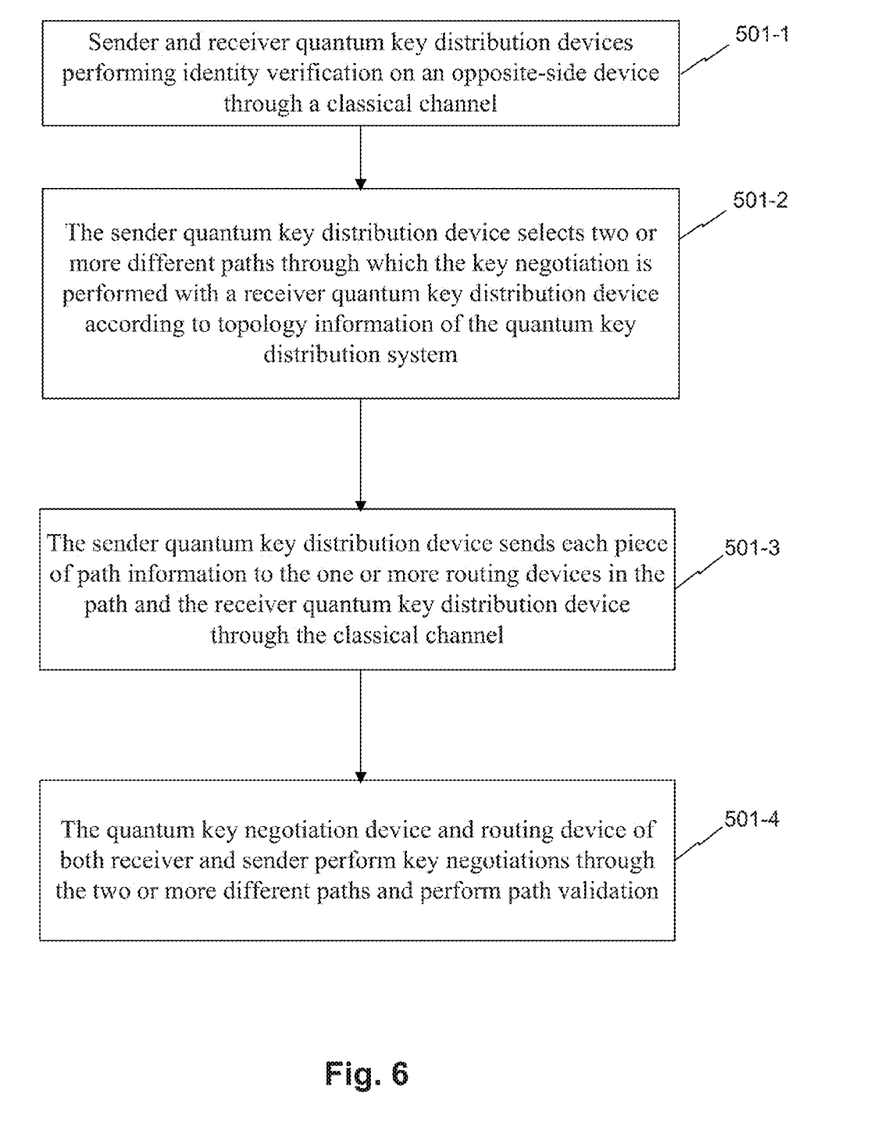
FIG. 6 is a processing flow chart of adopting multiple paths for performing key negotiations according to one embodiment of the present disclosure.

Step 501-1: the sender and receiver quantum key distribution devices perform identity verification on a partner device through a classical channel.

For example, the sender quantum key distribution device (referred to as an A device) first sends a key negotiation request to a receiver quantum key distribution device (referred to as a B device) through a classical channel. The request at least contains identity information about the A device (for example, account information). The request is forwarded to the B device by several routing devices, and the B device verifies the legality of the identity of the A device carried in the request. If the identity is legal, a response is sent to the A device, and at the same time, the identity information about the B device may be carried in the response. Similarly, the A device verifies the identity of the B device after receiving the response. If both the A device and the B device recognize each other being legal (i.e. authenticated) after the above-mentioned verification process, the following processing can be continued, otherwise the present method is completed.

In some embodiments, other identity verification mechanisms can be used, such as the mechanism of using a digital certificate, as long as it can confirm whether the identity of the opposite-end quantum key distribution device which performs quantum key negotiation with is legal.

Step 501-2: the sender quantum key distribution device selects two or more different paths performing key negotiation with the receiver quantum key distribution device according to the topology information of a quantum key distribution system.

The sender quantum key distribution device may select two or more different paths according to the network topology information obtained in advance. The routing devices involved in any two paths may be different routing devices. The different paths may not share any common routing device. When the sender quantum key distribution device chooses a routing path, the sender quantum key distribution device can use a load balancing strategy.

Step 501-3: the sender quantum key distribution device sends each piece of path information to the one or more routing devices in the path and the receiver quantum key distribution device through the classical channel.

The relevant information of each node in path may be contained in the path information, and after routing, the sender quantum key distribution device can send the path information of each path to the routing device in the path and the receiver quantum key distribution device through the classical channel. These devices can verify other's identity in the process of relaying quantum key, as described below with reference to step 501-4.

Step 501-4: the quantum key negotiation device and routing device of both receiver and sender perform key negotiations through the two or more different paths, and perform path validation in this process.

In some embodiments, in order to meet the requirements of long-distance transmission, trusted relaying may be used. In each path, every two neighboring devices can obtain shared keys through the key negotiation process of a quantum channel, and realize the relay forwarding of key, and finally allow the quantum key distribution devices of both the receiver and sender obtain the same shared key. In one example, the shared keys between every two neighboring devices can be obtained by adopting the above-mentioned dynamic negotiation, and can also adopt the initial key preset during factory manufacture or the shared key pre-negotiated by both sides, which could likewise realize the above-mentioned relay function.

In some embodiments, the multiple paths performing key negotiation are generally selected by adopting the load-balancing mechanism, and may any common routing device. As a result, the routing device may only conduct the forwarding operation, may need to conduct a combination operation through various multiplexing means, or conduct respective splitting operation through corresponding de-multiplexing means, and finally complete the end-to-end quantum key negotiation process in multiple paths.

Furthermore, in order to prevent attacks from a man-in-the-middle, in some embodiments, a path verification technology can be used. Each routing device and receiver quantum key distribution device first performs verification on the identity of the neighboring device according to received path information, before performing key negotiation with a neighboring device and a corresponding relaying operation. If the verification succeeds, key negotiation is performed with the neighboring device and a key relaying operation of the present node is completed; otherwise, the sender quantum key distribution device is notified to quit the key negotiation process of a corresponding path.

In on example, dynamic routing also can be performed through a routing device based on a load balancing strategy so as to realize performing the key negotiation via two or more different paths. If a dynamic routing mechanism is used, path verification can be performed after completing the quantum key negotiation process, i.e., a sender or receiver quantum key distribution device or a monitoring node verifies the legality of the identity of each device participating in each path key negotiation process by collecting path information about the current key negotiation. If an illegal device (indicating that man-in-the-middle attack may be present) is detected, the sender and receiver quantum key distribution devices are notified to give up the shared keys acquired through the corresponding path negotiation. In addition, in order to fully fend off the attack on a relaying node, the paths used in the present step for performing end-to-end quantum key negotiation can be multiple paths which are completely unrelated, which means that the attack on any one relaying node only has influence on the security of a path and does not influence other paths.

Step 502: the sender or receiver quantum key distribution device determines whether to combine shared keys acquired through the key negotiation process according to a preset strategy; if so, step 503 is performed.

The quantum key distribution devices of the receiver and sender generally can acquire multiple shared keys (being consistent with the path number) through the multipath negotiation process of step 501, and it is determined whether a combination operation is required to be performed through a preset strategy in the present step.

The sender or receiver quantum key distribution device may acquire a security assessment result (such assessment of a bit error rate, a packet loss rate, etc.) of performing key negotiation via each path. If the security evaluation result of any one path exceeds a security range set in the strategy, the path or relaying node may have a security risk, and a corresponding combination operation is required to be performed on a shared key acquired in multipath.

In one example, multiple key combination modes can be adopted. Therefore, the quantum key distribution device making the above determination can select the specific processing mode for performing key a combination operation, consult with the opposite-end quantum key distribution device, and confirm the specific processing mode of key combination through the classical channel. The quantum key distribution device of the receiver and sender can perform identical combination processing on the shared key in step 503, and thus both sides can obtain a new shared key.

Step 503: the send and the receiver quantum key distribution devices each combine the shared keys to generate a new shared key.

The algorithm adopted for combination operation is described above. Under the application scenarios with higher network security, the quantum key distribution device of the receiver and sender can negotiate simultaneously to obtain multiple shared keys, so as to improve the key distribution amount. In a situation of a relatively low network security, even if relay nodes of a certain path or a plurality of paths are broken, a new secure shared key still can be generated by combination operations on keys of different paths as long as one path is secure, so that the security of the whole quantum key distribution network can be improved.

Accordingly, the quantum key distribution device of the sender can use the obtained shared key to encrypt data to be transmitted, and forward the data to the quantum key distribution device of the receiver via the routing device. The quantum key distribution device of the receiver can adopt the shared key identical to that of the sender to decrypt the received data. Due to the increase of key distribution amount, data interactive throughput also can be correspondingly raised.

Furthermore, the quantum key distribution method described above may be applied to a cloud computing network, to meet the requirements for various aspects of the cloud computing network such as cloud key security, code generating amount, transmission range and data transmission.

(I) The described method can be applied to a cloud backbone network (data center).

In order to achieve secure data transmission between any two servers in a cloud computing data center, the quantum key distribution device respectively connected with the servers can perform multi-path key negotiation, and perform encryption and decryption on data by using the obtained shared key, so as to achieve the secret transmission of data.

(II) The method can be applied to a system consisting of a cloud backbone network (data center) and a cloud user network.

In order to achieve secure data transmission between a cloud user network and any one of servers of a cloud computing data center, the quantum key distribution device of the cloud user network and the quantum key distribution device connected with the server can perform multi-path key negotiation, and perform encryption and decryption on data by using the obtained shared key, so as to achieve the secret transmission of data.

(III) The method can be applied to a system consisting of a distributed cloud computing data center and the cloud user network.

In order to achieve secure data transmission (data backup or data access) between any two servers positioned at different cloud computing data centers, the quantum key distribution devices respectively connected with the servers can perform multi-path key negotiation, and perform encryption and decryption on data by using the finally obtained shared key, so as to achieve the secret transmission of data.

In order to achieve secure data transmission between the cloud user network and any one of servers of the distributed cloud computing data center, the quantum key distribution device of the cloud user network and the quantum key distribution device connected with the server can perform multi-path key negotiation, and perform encryption and decryption on data by using the obtained shared key, so as to achieve the secret transmission of data.

Figure 7:
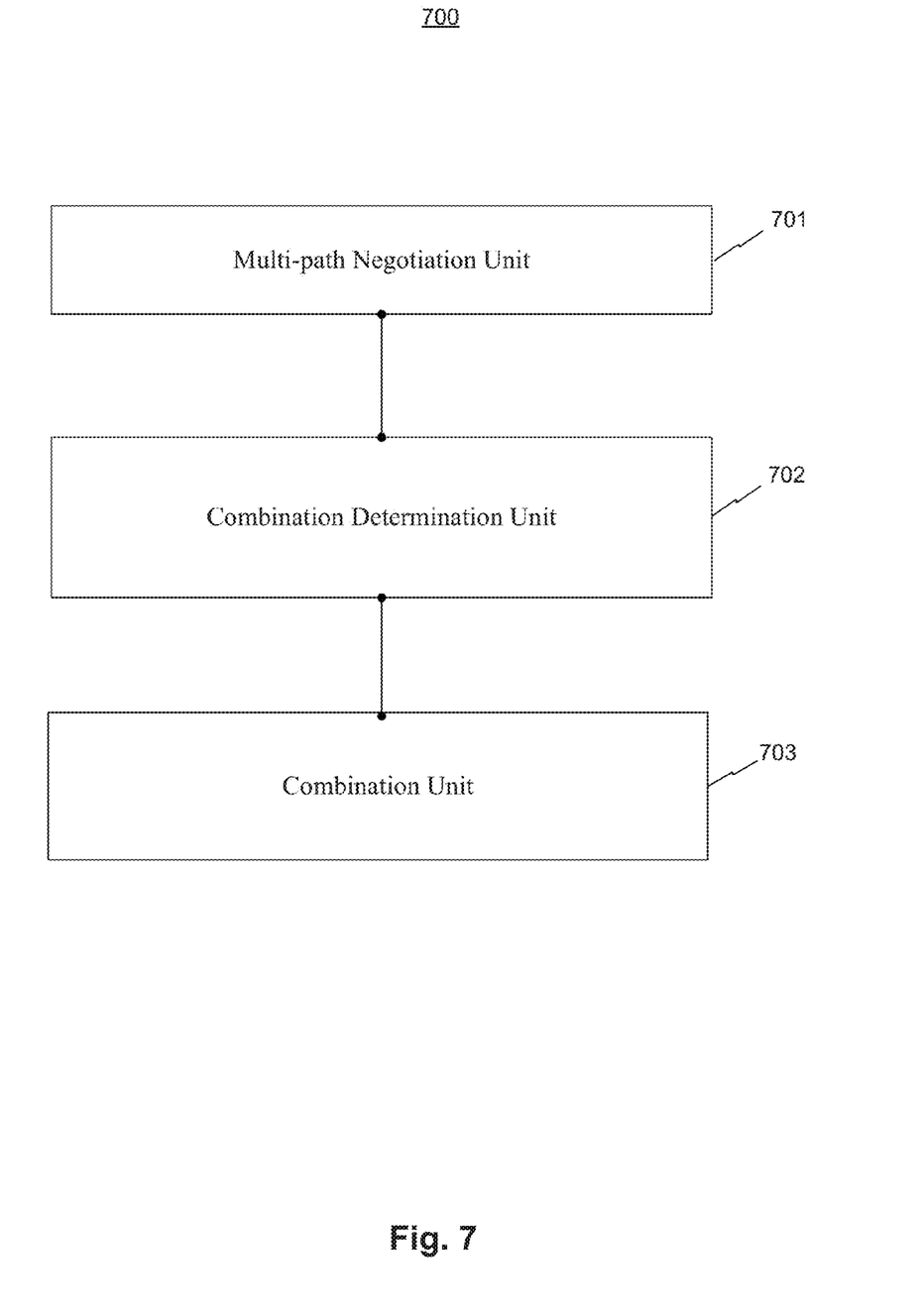
FIG. 7 is a schematic diagram of a quantum key distribution device based on trusted relays according to one embodiment of the present disclosure.

FIG. 7 shows a schematic diagram of an embodiment of the quantum key distribution device 700 based on trusted relay consistent with some embodiments of the present disclosure.

A quantum key distribution (sender)device based on trusted relay according to some embodiments comprises:

a multi-path negotiation unit 701 configured to perform key negotiation with a receiver quantum key distribution device by adopting two or more different paths via a relay of routing device, wherein the two or more different paths each include one or more routing devices and the two or more different paths do not share any common routing device;

a combination determination unit 702 configured to determine whether a combination operation needs to be performed on the shared key obtained by the key negotiations by the sender quantum key distribution device and the receiver quantum key distribution device according to a preset strategy; and a combination unit 703 configured to execute a corresponding key combination operation respectively by the sender quantum key distribution device and the receiver quantum key distribution device to generate a new shared key when the output of the combination determination unit is "Yes".

Optionally, the apparatus may also comprise a path acquisition unit configured to select the two or more different paths which perform key negotiations with the receiver quantum key distribution device by the sender quantum key distribution device according to topology information of the quantum key distribution system before triggering the multipath negotiation unit to work.

Optionally, the apparatus may further include a path distribution unit configured to send each piece of path information to the routing device comprised in the path and the receiver quantum key distribution device by the sender quantum key distribution device through a classical channel before triggering the multipath negotiation unit to work.

Correspondingly, besides the body subunit for achieving the functions, the multipath negotiation unit may further include a path verification subunit configured to:

verify, by the routing device in the path and the receiver quantum key distribution device, the identity of opposite-end device which performs key negotiation with the same according to the received path information;

if the verification succeeds, perform key negotiation with the opposite-end device and complete a key relay operation of the node;

otherwise, notify the sender quantum key distribution device to quit a key negotiation process of a corresponding path.

Optionally, the multipath negotiation unit may be configured to perform the key negotiation through two or more different paths by means of a dynamic routing function of the routing device.

Optionally, the apparatus may include a path verification unit configured to:

verify the identity legality of the device participating in the key negotiation process of each path by the sender or receiver quantum key distribution device through acquiring the path information of the current key negotiation after the implementation of the multipath negotiation unit; and if an illegal device is detected, the sender quantum key distribution device and the receiver quantum key distribution device give up a shared key acquired by the corresponding path negotiation.

Optionally, the apparatus may further include an identity verification unit configured to perform identity verification on the opposite-end device by the sender quantum key distribution device and the receiver quantum key distribution device through a classical channel before triggering the multipath negotiating unit to work. If the opposite-end device does not pass the identity verification, the implementation of the method is terminated.

Optionally, the combination determination unit may include:

a safety assessment result acquisition subunit configured to acquire a safety assessment result of performing key negotiation via each path by the quantum key distribution device;

a strategy determination subunit configured to determine whether implementing the combination operation by the quantum key distribution device according to a preset strategy and the safety assessment result; and a selection and negotiation subunit configured to, by the quantum key distribution equipment, select a specific processing manner of executing a key combination operation, negotiate with opposite-end quantum key distribution device through the classical channel, confirm the specific processing manner of the key combination operation, and trigger the merging execution unit.

Optionally, the apparatus may further include:

a data encrypting transmission unit configured to use an obtained shared key to encrypt data to be transmitted and forwarding the data to the receiver quantum key distribution device by the sender quantum key distribution device via the routing device; and a data decryption unit configured to decrypt the received data by the receiver quantum key distribution device by using the same shared key as the sender.

The specification has described methods, apparatus, and systems for quantum key distribution. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable storage medium" should be understood to include tangible items and exclude carrier waves and transient signals, i.e., be non-transitory. Examples include RAM, ROM, volatile memory, nonvolatile memory, hard drives, CD ROMs, DVDs, flash drives, disks, and any other known physical storage media. The modules/units described above may be implemented in a form of software, hardware, firmware, or any combination of software, hardware, and firmware. For examples, the modules/units may be implemented by a processor executing software instructions stored in the computer-readable memories.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A quantum key distribution system, comprising:
a plurality of routing devices configured to relay keys; and
a quantum key distribution device connected with the routing devices and configured to use two or more different paths to perform corresponding quantum key negotiations with another quantum key distribution device to obtain shared keys, wherein the two or more different paths each include one or more of the routing devices.

2. The quantum key distribution system according to claim 1, wherein:
the quantum key distribution device is further configured to combine the shared keys to generate a new shared key.

3. The quantum key distribution system according to claim 1, wherein:
the quantum key distribution device is further configured to send, before initiating the corresponding quantum key negotiations, path information about the quantum key negotiations to a routing device in the path or to the another quantum key distribution device.

4. The quantum key distribution system according to claim 1, wherein:
the system further comprises a quantum gateway device through which the quantum key distribution device is connected to a data device; and
the quantum gateway device is configured to encrypt and decrypt data by using a quantum key provided by the quantum key distribution device.

5. The quantum key distribution system according to claim 1, wherein:
the quantum key distribution system is deployed in a cloud computing data center; and
the system further includes a server connected to the quantum key distribution device.

6. The quantum key distribution system according to claim 5, wherein the system further comprises a cloud user network including the another quantum key distribution device.

7. The quantum key distribution system according to claim 1, wherein the quantum key distribution device is in a data center of a distributed cloud computing network.

8. The quantum key distribution system of claim 1, wherein the two or more different paths involves a first path using a sequence of one or more of the routing devices different from a sequence of one or more of the routing devices utilized by other paths of the two or more different paths.

9. A quantum key distribution method, comprising:
selecting two or more paths each including one or more routing devices, the one or more routing devices connecting a quantum key distribution device with another quantum key distribution device; and
performing key negotiations by the quantum key distribution device with the another quantum key distribution device through the two or more different paths to obtain shared keys.

10. The quantum key distribution method according to claim 9, further comprising:
combining the shared keys to generate a new shared key.

11. The quantum key distribution method according to claim 10, wherein, before combining the shared keys, the method further comprises:
acquiring, by the quantum key distribution device, a safety assessment result of performing key negotiation via each of the two or more paths;
determining whether the combining the shared keys is needed based on the safety assessment result; and
if the combining the shared keys is needed, the method further comprising:
selecting a key combination operation;
communicating by the quantum key distribution device the selected key combination operation through a classical channel to the another quantum key distribution device; and
combining the shared keys with the key combination operation by the quantum key distribution device and the another quantum key distribution device.

12. The quantum key distribution method according to claim 9, further comprising:
sending, by the quantum key distribution device, through a classical channel, path information of each selected path to the routing devices in the selected path; and
verifying, by the routing devices, an identity of the quantum key distribution device using the path information.

13. The quantum key distribution method according to claim 9, further comprising:
sending, by the quantum key distribution device, through a classical channel, path information of each selected path to the another quantum key distribution device; and
verifying, by the another quantum key distribution device, an identity of the quantum key distribution device using the path information.

14. The quantum key distribution method according to claim 9, further comprising:
verifying, by the quantum key distribution device, an identity of the another quantum key distribution device through a classical channel.

15. The quantum key distribution method according to claim 9, further comprising:
using, by the quantum key distribution device, an obtained shared key to encrypt data to be transmitted.

16. The quantum key distribution method according to claim 15, further comprising:
forwarding, by the quantum key distribution device, the encrypted data to the another quantum key distribution device; and
using, by the another quantum key distribution device, a copy of the obtained shared key to decrypt the received data.

17. The quantum key distribution method according to claim 9, wherein:
the quantum key distribution device and the another quantum key distribution device are connected to servers.

18. A quantum key distribution device, comprising:
a memory storing a set of instructions;
a processor configured to execute the set of instructions to cause the apparatus to:
perform key negotiations with another quantum key distribution device through two or more different paths, wherein the two or more different paths each include one or more routing devices;
determine whether a combination operation is required to be performed on shared keys obtained through the key negotiations; and
combine the shared keys to generate a new shared key if the combination operation is required to be performed on the shared keys obtained through the key negotiation process.

19. The device according to claim 18, wherein the processor is further configured to execute the set of instructions to cause the device to:
select the two or more different paths through which the key negotiations are performed with the another quantum key distribution device according to topology information about a quantum key distribution system including the quantum key distribution device.

20. The device according to claim 19, wherein the processor is further configured to execute the set of instructions to cause the device to:
send, through a classical channel, each path infatuation of a selected path to a routing device in the selected path and to the another quantum key distribution device.

21. A non-transitory computer-readable storage medium having stored therein instructions that are executable by one or more processors of a device to cause the device to perform a quantum key distribution method comprising:
selecting two or more paths each including one or more routing devices, the one or more routing devices connecting a quantum key distribution device with another quantum key distribution device; and
performing key negotiations by the quantum key distribution device with the another quantum key distribution device through the two or more different paths to obtain shared keys.

22. The non-transitory computer readable medium of claim 21, wherein the instructions are executable by the one or more processors of the device to cause the device to further perform:
combining the shared keys to generate a new shared key.

23. The non-transitory computer readable medium of claim 22, wherein the instructions are executable by the one or more processors of the device to cause the device to further perform:
acquiring, by the quantum key distribution device, a safety assessment result of performing key negotiation via each of the two or more paths;
determining whether the combining the shared keys is needed based on the safety assessment result; and if the combining the shared keys is needed:
  selecting a key combination operation;
  communicating by the quantum key distribution device the selected key combination operation through a classical channel to the another quantum key distribution device; and
  combining the shared keys with the key combination operation by the quantum key distribution device and the another quantum key distribution device.

24. The non-transitory computer readable medium of claim 21, wherein the instructions are executable by the one or more processors of the device to cause the device to further perform:
  sending, by the quantum key distribution device, through a classical channel, path information of each selected path to the routing devices in the selected path; and
  verifying, by the routing devices, an identity of the quantum key distribution device using the path information.

25. The non-transitory computer readable medium of claim 21, wherein the instructions are executable by the one or more processors of the device to cause the device to further perform:
  sending, by the quantum key distribution device, through a classical channel, path information of each selected path to the another quantum key distribution device; and
  verifying, by the another quantum key distribution device, an identity of the quantum key distribution device using the path information.

26. The non-transitory computer readable medium of claim 21, wherein the instructions are executable by the one or more processors of the device to cause the device to further perform:
  verifying, by the quantum key distribution device, an identity of the another quantum key distribution device through a classical channel.

27. The non-transitory computer readable medium of claim 21, wherein the instructions are executable by the one or more processors of the device to cause the device to further perform:
  using, by the quantum key distribution device, an obtained shared key to encrypt data to be transmitted.

28. The non-transitory computer readable medium of claim 27, wherein the instructions are executable by the one or more processors of the device to cause the device to further perform:
  forwarding, by the quantum key distribution device, the encrypted data to the another quantum key distribution device; and
  using, by the another quantum key distribution device, a copy of the obtained shared key to decrypt the received data.

29. The non-transitory computer readable medium of claim 21, wherein the quantum key distribution device and the another quantum key distribution device are connected to servers.

* * * * *